UNITED STATES PATENT OFFICE.

KARL ELBEL, OF BIEBRICH, GERMANY, ASSIGNOR TO THE FIRM OF KALLE AND COMPANY, AKTIENGESELLSCHAFT, OF BIEBRICH, GERMANY.

MANUFACTURE OF A NEW BETA-NAPHTHOL-ORTHO-OXY-AZO DYE.

1,023,199.　　Specification of Letters Patent.　　Patented Apr. 16, 1912.

No Drawing.　　Application filed September 18, 1911. Serial No. 649,958.

*To all whom it may concern:*

Be it known that I, KARL ELBEL, a citizen of the German Empire, residing at Biebrich-on-the-Rhine, Germany, have invented certain new and useful Improvements in the Manufacture of a New Beta-Naphthol-Ortho-Oxy-Azo Dye, of which the following is a specification.

In my specification of the same date I have described a process for producing fast ortho-oxy-azo dyestuffs consisting in coupling the chloro-1-diazo-2-oxy-napthalene-4-sulfonic acid with azo-dyestuff components. Now I have found that a very valuable dyestuff of this kind may be obtained by coupling this chloro-1-diazo-2-oxy-naphthalene-4-sulfonic acid with beta-naphthol. For instance I proceed as follows: The separated chlorinated diazo compound obtained according to the process of Example 1 of my above named specification by the action of chlorin on 125 kilograms of 1-diazo-2-oxy-naphthalene-4-sulfonic acid in the presence of fuming sulfuric acid is stirred with 300 liters of water and neutralized by means of calcined sodium carbonate. The obtained neutralized solution is mixed with a solution of 40 degrees centigrade containing 75 kg. of beta-naphthol in 250 liters of water and of 65 kg. caustic soda lye of 40° Bé. Thereupon 75 kg. of calcined carbonate of sodium are also added to the solution. The temperature rises spontaneously to about 33 degrees centigrade and remains at this temperature for some time and is afterward maintained by artificial heat. The mass after being stirred during 4 to 5 hours, is diluted with 1000 liters of water, acidified with about 100 liters of hydrochloric acid and heated up to 70 degrees centigrade. Then the dye-stuff separates in a form liable to be easily filtered. It is filtered, pressed and dried.

It is soluble in hot water with a bluish-red color, which turns on addition of alkali into a bright blue, and in concentrated sulfuric acid with a pure greenish-blue color. The dye-stuff dyes wool in an acid bath with bluish-red tints turning into dark blue by the treatment with bichromate, which is very fast against light and potting. On treatment with reducing agents the product is decomposed into chloro-1-amino-2-oxynaphthalene-4-sulfonic acid and 1-amino-2-oxynaphthalene.

I claim:

As a new product the chloro-2-oxy-naphthalene-4-sulfonic acid-1-azo-beta-naphthol obtainable by combining the chloro-1-diazo-2-oxy-naphthalene-4-sulfonic acid with beta-naphthol, which dyestuff is in dry state a black powder, soluble in hot water with a bluish-red color, which on addition of alkali turns into a bright blue, and in concentrated sulfuric acid with a pure greenish-blue color, and dyeing wool in an acid bath with bluish-red tints turning by the treatment with bichromate into a dark blue, very fast against light and potting, and being decomposed on treatment with reducing agents into chloro-1-amino-2-oxynaphthalene-4-sulfonic acid on the one hand and 1-amino-2-oxy-naphthalene on the other hand.

In testimony whereof I have signed my name to this specification in the presence of two subscribing witnesses.

KARL ELBEL.

Witnesses:
　AUGUST ROTH,
　JOHANN RAINCUSÉE.